United States Patent [19]
Vick et al.

[11] Patent Number: 5,543,487
[45] Date of Patent: Aug. 6, 1996

[54] HYDROXYMETHYLATED RESORCINOL COUPLING AGENT AND METHOD FOR BONDING WOOD

[75] Inventors: Charles B. Vick, Sun Prarie, Wis.; Klaus H. Richter, Wetzikon, Switzerland; Bryan H. River, Madison, Wis.

[73] Assignee: The United States of America as represented by the Secretary of Agriculture, Washington, D.C.

[21] Appl. No.: 343,386

[22] Filed: Nov. 22, 1994

Related U.S. Application Data

[62] Division of Ser. No. 186,182, Jan. 19, 1994, abandoned.
[51] Int. Cl.⁶ .................................................... C08G 8/04
[52] U.S. Cl. ..................... 528/158; 528/150; 528/165; 427/408; 427/444; 568/766
[58] Field of Search ...................................... 427/408, 444; 528/158, 150, 165; 568/766

[56] References Cited

U.S. PATENT DOCUMENTS

| | | | |
|---|---|---|---|
| 2,982,788 | 5/1961 | Bras et al. | 568/764 |
| 3,706,619 | 12/1972 | Freeman | 528/129 |
| 3,929,695 | 12/1975 | Murata et al. | 528/129 |

*Primary Examiner*—James J. Seidleck
*Assistant Examiner*—Richard Jones
*Attorney, Agent, or Firm*—Janet I. Stockhausen; M. Howard Silverstein; John D. Fado

[57] ABSTRACT

A hydroxymethylated resorcinol coupling agent is provided, including a hydroxymethylated resorcinol as an active ingredient, which enables commercial thermosetting adhesives such as bisphenol-A epoxy, phenol-resorcinol-formaldehyde, emulsion-polymer isocyanate, phenol-formaldehyde, resorcinol-formaldehyde and other resins of similar chemical nature to develop strong and durable bonds to a variety of untreated and preservatively treated woods. The resulting bonds to wood withstand delaminating stresses that occur with weather and water in exterior environments.

8 Claims, 7 Drawing Sheets

HYDROXYMETHYLATED RESORCINOL COUPLING AGENT AND METHOD FOR BONDING WOOD

This is a division of application Ser. No. 08/186,182 filed Jan. 19, 1994, now abandoned.

FIELD OF THE INVENTION

The present invention generally relates to adhesives. More specifically, the invention is directed to adhesive systems that are used for bonding wood-based materials. The invention is particularly directed to the use of hydroxymethylated resorcinol as a coupling agent for enhanced adhesion of adhesives to wood-based materials. Typical adhesives include epoxy and other thermosetting wood adhesives such as phenol-resorcinol, resorcinol-, phenolic-, and isocyanate-based adhesives with specific application to chromium-copper-arsenate (CCA)-treated wood as well as untreated wood.

REFERENCES CITED IN THE SPECIFICATION

Reference is made to the Bibliography preceding the claims for a full citation of references in the specification.

BACKGROUND OF THE INVENTION

Adhesion of two surfaces can be enhanced by primers, coupling agents and other surface treatments. Because of the unique properties associated with certain non-wood materials such as metals, composites, ceramics and plastics, adhesion enhancement is often essential for developing highly durable bonds between the two surfaces. In those industries such surface treatments are commonplace.

In the lumber industry, wood products are frequently adhesively bonded. However, the performance of adhesives in wood products is decreased if the wood product has first been treated or if the wood will be used in wet conditions. For example, epoxy adhesives provide a bond that is as strong as the wood itself as long as the wood remains dry in service. The main disadvantage of using epoxy adhesives with wood products is that the adhesive bond delaminates in wet-use conditions. Therefore, epoxies have not heretofore been used to laminate or repair timbers if the bonds are to be subjected to shear and tension loading. Clark and Nearn (1957) and Williamson and Nearn (1958) investigated formulations, assembly factors, temperatures of cure, wood species and their densities as they affected the strength and durability of epoxy adhesives made from epichlorohydin and bisphenol A resin. In the early 1960's, improved epoxy formulations were developed that were capable of withstanding more severe exposure conditions Olson and Blomquist (1962). In the late 1960's, more apparent progress was made developing durable epoxy bonds using polyethylenimine primer by the Weyerhaeuser Company and the Dow Chemical Company Caster (1980).

Water-based wood adhesives such as phenolics, resorcinolics, isocyanates, ureas and melamines perform well only on wood that has not been chemically or physically altered. Wood treated with an inorganic preservative, such as chromium-copper-arsenate (CCA), is difficult to bond effectively for wet-use applications. The surface of CCA-treated wood is covered with insoluble and chemically fixed deposits of chromium, copper and arsenic. The deposits physically block polar adhesives from chemically bonding to wood which is normally polar. Vick and Kuster (1992) suggested that adhesively bonded products made from lumber, veneer, flakes and fibers can play a prominent role in the market place if difficulties in bonding preservative-treated wood can be overcome.

Phenolic-based adhesives have heretofore been used in the rubber industry. For example, U.S. Pat. Nos. 4,238,595 and 4,246,144 to Girgis describe phenolic aldehyde resins used for adhesive coatings to bind substrates such as glass fibers to rubber. Solomon (1990) suggested incorporating a resorcinol-formaldehyde thermosetting resin into a rubber-latex tire-cord adhesive. However, to date the use of a resorcinol-formaldehyde coupling agent to assist in providing greater adhesion by epoxy, phenol-resorcinol, or isocyanate-based adhesives between wood surfaces has not been shown.

SUMMARY OF THE INVENTION

The present invention is directed to a method of enhancing the attachment of an adhesive to a lignocellulosic material. The method comprises applying a resorcinol-formaldehyde derivative to a surface of the lignocellulosic material and attaching the adhesive to the primed surface. The resorcinol-formaldehyde derivative consists essentially of a mixture of water, formaldehyde, sodium hydroxide and resorcinol in sufficient amounts to provide an effective coupling agent. The lignocellulosic material is wood in the preferred embodiment and in particular CCA-treated wood.

The purpose of the present invention is to provide a primer with strong adhesion characteristics even for difficult to bond woods such as hardwoods or CCA-treated softwoods and hardwoods. The primer penetrates the wood deeply and physicochemically bonds to it. The adhesive that is applied to the primed wood physicochemically bonds to the primer, thus bonding wood to wood or wood to other substrates. The bond strengths and durability are great enough to be suitable for structural applications.

The present invention advantageously assists in providing a higher resistance to delamination of bonded wood joints than the prior art. Delaminating stresses are caused by repeated water saturation, cyclical moisture exposure and drying, or direct exposure to adverse weather conditions. By utilizing the primer or coupling agent of the present invention, CCA-treated lumber may be laminated into timbers with phenol-resorcinol, epoxy and isocyanate-based adhesives for service in exterior exposure conditions.

The present invention enhances adhesion by increasing wetability of wood surfaces, particularly inactivated and chemically-treated wood surfaces. The highly polar attractive forces of the hydroxymethylated resorcinol coupling agent act to increase the critical surface tension of wood-based materials which enables adhesives to wet the wood surfaces allowing them to flow and penetrate more effectively than they would have without the coupling agent The present invention enhances adhesion of wood to epoxy, phenol-resorcinol, and emulsion-polymer isocyanate adhesives by physicochemical adsorption as well as mechanical interlocking of the adhesive within the porous structure of the wood. Enhanced strength and water resistance of the wood-coupling agent-adhesive bond is primarily attributable to physicochemical forces that include hydrogen bonds, covalent bonds, dipole/dipole forces and London (dispersion) forces.

The primer solution may be used with a variety of wood substrates including preservative-treated woods. New product lines may be provided from adhesively bonded lumber, veneer, flakes, and fibers that have been protected from biological deterioration by treatments such as CCA or other inorganic preservatives. The coupling agent may also be used with difficult-to-bond, high density wood such as red and white oak, birch and hard maple. The coupling agent also enhances adhesion to wood surfaces that have been inactivated through long-term aging and migration of wood extractives to the surfaces, particularly for phenol-resorcinol laminating adhesives. Even abrasively-planed wood surfaces can be more effectively bonded using the coupling agent.

The invention has direct application to boat hulls, wood aircraft parts and air frames, wind generator blades and components, skis, hockey sticks, bows and gun stocks, railings, columns, stair treads, fences, window and door components, structural beams and timbers of preservatively treated wood, laminated preservatively treated bridge components and ship structural components.

Many commercially available thermosetting resin adhesives may be used with the coupling agent of the present invention. Examples include epoxies, phenolics, resorcinolics, isocyanate-based adhesives and probably amino resin adhesives. Specific useful resins include bisphenol-A epoxy resins, phenol-resorcinol-formaldehyde (PRF) resins and emulsion polymer/isocyanate resin adhesives.

Reference is now made in detail to the preferred embodiments of the invention, examples of which are illustrated in the accompanying figures.

DETAILED DESCRIPTION OF THE INVENTION

The present invention is directed to an adhesive primer solution and a method for use with epoxies as well as phenol-resorcinol, and isocyanate-based adhesives to bond either untreated wood or wood treated with preservatives. The primer or coupling agent is an aqueous alkaline solution containing a reactive hydroxymethylated resorcinol. A surfactant is provided to allow the coupling agent to spread evenly on certain resinous softwood species. The surfactant is known in the prior art for providing certain characteristics to solutions and is not, by itself, part of the present invention.

Coupling agents are chemical molecules with dual functionality. In use, one part of the molecule will adhere to one surface, e.g., a wood surface, while another part of the molecule will adhere to the surface of another material, e.g., an adhesive polymer. Thus, a bonded bridge is formed between two different materials. A coupling agent need not form only a covalent chemical bond, it may also form hydrogen bonds, as well as develop intermolecular dipole-dipole forces and London (dispersion) forces.

The coupling agent is a phenolic-aldehyde derivative. In its preferred embodiment, the coupling agent is a monomeric species of hydroxymethylated resorcinol (HMR). The coupling agent can be mono-, di- or tri-hydroxymethyl resorcinol, all forms of which are reactive at room temperature. The molar ratio of formaldehyde to resorcinol which is used in forming the coupling agent, is the amount required to produce maximum hydroxymethylation of the monomeric species. However, an excess of oligomers is formed if the induction period is too long, thereby weakening the bonding. This type of polymerization must be limited since the effectiveness of the coupling agent decreases as polymerization increases.

The present invention enhances adhesion of wood to epoxy, phenol-resorcinol, and emulsion-polymer isocyanate adhesives by physicochemical adsorption as well as mechanical interlocking of the adhesive within the porous structure of the wood. Enhanced strength and water resistance of the wood-coupling agent-adhesive bond is primarily attributable to physicochemical forces that include hydrogen bonds, covalent bonds, dipole/dipole forces and London (dispersion) forces.

Figure 1:
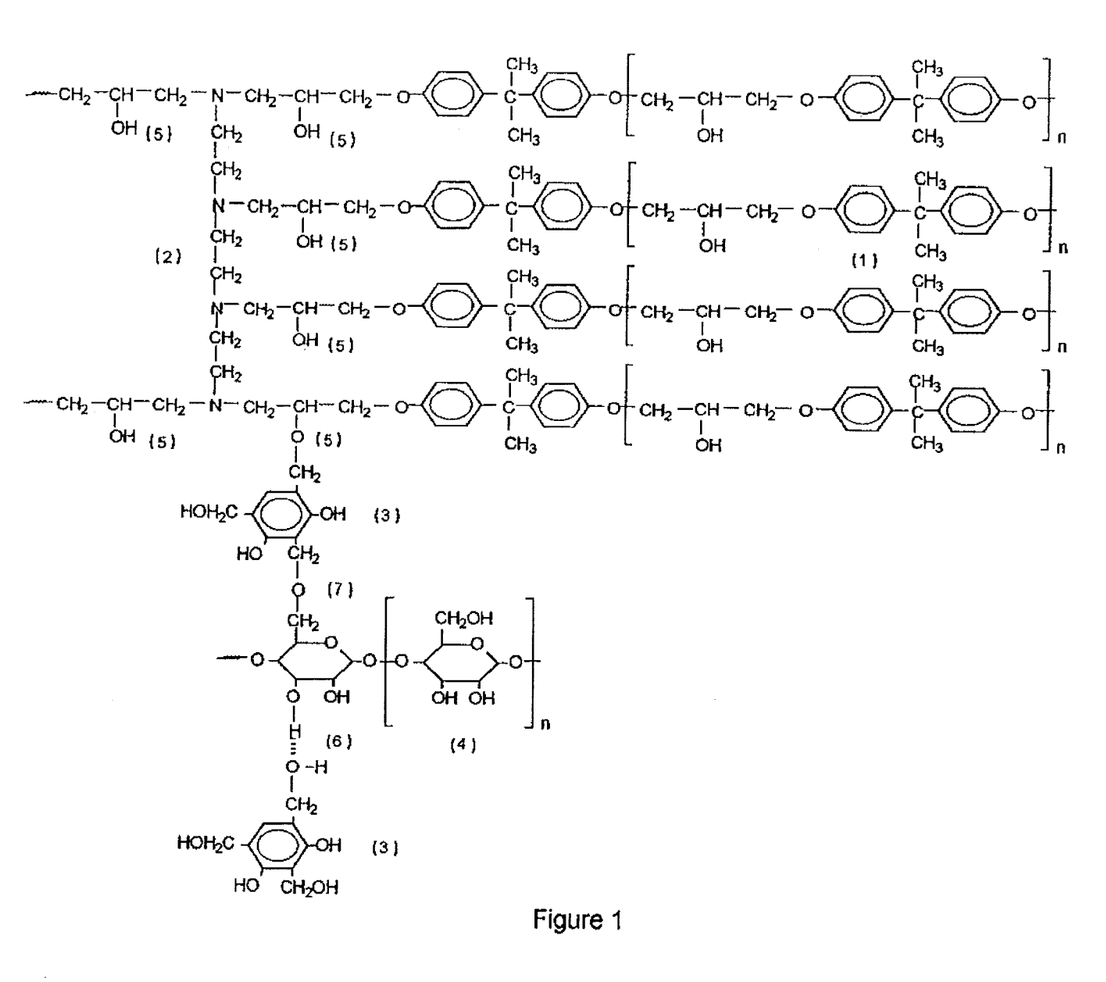
FIG. 1 is a schematic of the chemical formulations illustrating hydroxymethylated resorcinol (HMR) coupling agent bonding with a bisphenol-A epoxy resin and lignocellulosic (wood) material.

Hydrogen-bonding is normally believed to contribute weak bonds in comparison with covalent bonds. Hydrogen bonds are known to have a dissociation energy between 1–9 kilocalories per mole. However, HMR is a very highly polar molecule and is strongly attracted to the polar molecules in wood. The 3 hydroxyls on the hydroxymethylated groups form hydrogen bonds. The 2 meta-positioned hydroxyls are not reactive but they are capable of forming hydrogen bonds. Out of the 6 positions on the benzene ring, five have hydroxyl groups capable of hydrogen bonding while three of the groups are reactive hydroxymethyl groups as illustrated in FIG. 1. Referring to FIG. 1a and b(1) indicates a bisphenol-A/epichlorohydrin resin; (2) indicates a triethylenetetramine curing agent; (3) indicates a trihydroxymethyl resorcinol coupling agent; (4) indicates a cellulosic of wood; (5) indicates a probable ether linkage; (6) indicates a hydrogen bond; and (70 indicates a possible ether linkage.

Wood cellulose and lignin are relatively rich with secondary hydroxyl groups. With multi-molecular layers of HMR coupling agent thoroughly covering and penetrating into cell lumens and cell walls, the opportunity for high density hydrogen bonding between wood molecules and HMR is available.

Furthermore, covalent bonding is also believed to occur. In the preferred embodiment, the HMR coupling agent may covalently bond with a bisphenol-A/epichlorohydrin resin and an aliphatic amine curing agent such as triethylenetetramine. Functional hydroxyl groups forming along the epoxy chains are capable of condensing with the hydroxymethyl groups of the HMR coupling agent to form ether linkages between the coupling agent and the epoxy. Other hydroxymethyl groups attached to the coupling agent are capable of forming ether linkages with the primary hydroxyl groups on cellulose. A cross-linked polymeric system is provided which is formed between the epoxy resin and the cellulose as schematically shown in FIG. 1.

The mechanism by which the HMR coupling agent bonds to chromium-copper-arsenate (CCA) treated wood is somewhat different from bonding to untreated woods. The cell walls of wood treated with CCA are thoroughly covered with hemispherically-shaped deposits consisting of mixtures of chromium, copper and arsenic. These metals are physicochemically bonded to microfibrils within the cell walls mostly in the form of insoluble oxides of chromium, copper and arsenic. The insoluble metallic deposits are so pervasive that most opportunities for molecular forces of attraction to act between the normally polar wood lignocellulose and adhesives are physically blocked. Therefore, it is unlikely that an adhesive chemically bonds to or complexes with metals of the fixed preservative.

It appears that because of the relatively small molecular size of the monomeric hydroxymethylated resorcinol species and their highly polar nature, the species physicochemically adsorb and mechanically interlock within the microstructure of the metallic oxides. Therefore, the metallic oxide surface is converted to a highly polar and reactive surface by depositing the multi-molecular layers of the HMR coupling agent.

Hydroxymethylated Resorcinol (HMR) Coupling Agent

The HMR coupling agent can be used in the following forms: monohydroxymethylated resorcinol, dihydroxymethylated resorcinol, and trihydroxymethylated resorcinol. At appropriate molar ratios, maximum hydroxymethylation occurs while dimers, trimers, and perhaps a few oligomers condense as the induction period increases.

In the best mode, the HMR coupling agent is prepared in a 3:1 mole ratio of aldehyde-to-resorcinol at mildly alkaline conditions to yield a 5% solids aqueous solution. The aldehyde can be in the form of formaldehyde or paraformaldehyde. For purposes of the present invention, formaldehyde will be referenced.

The chemicals were reacted in situ for 4–6 hours at a temperature between 65° and 85° F. before application to the wood surfaces. The length of the induction period is critical to the effectiveness of the coupling agent—if either too short or too long, adhesion can range from no improvement to drastically impaired. The high level of dilution and low molecular weight of highly polar coupling agent allows the HMR to penetrate deeply. However, water from the coupling agent solution must be evaporated before bonding with epoxy adhesives.

The following proportions of ingredients were used to prepare the HMR coupling agent:

| Ingredients | Parts by Weight |
| --- | --- |
| Water, deionized | 90.43 |
| Resorcinol, crystalline | 3.34 |
| Formaldehyde, 37% in Methanol and water | 3.79 |
| Sodium hydroxide, 3M | 2.44 |
| Total | 100.00 |

A surfactant may be needed to aid complete wetting of resinous woods by HMR coupling agent.

Method of Use

The coupling agent must be spread on a wood surface 4–6 hours after mixing the ingredients of the coupling agent to create effective coupling between the adhesive and the wood surface. The hydroxymethyl groups in the alkaline catalyzed solution are so reactive at room temperature that the coupling agent must be applied to the wood surface before significant condensation polymerization takes place. If polymerization occurs, fewer reactive sites are available and adhesion to the coupling agent by the adhesive is subsequently inhibited. Conventional spreading methods may be used to spread the epoxy, or any other adhesive. Of course, spreading one-half of the adhesive on each wood surface within each bondline is preferred for maximum adhesion. However, industrial applications often spread only one surface, then close the joint soon after spreading to transfer adhesive to the opposite surface. The adhesive is generally spread after water from the primed surface has evaporated. This is essential for epoxy, but not for water-based adhesives.

The following experiments are offered by way of illustration and not by way of limitation.

The testing procedures and requirements for resistance to delamination of the American National Standard for Wood Products—Structural Glued Laminated Timber (ANSI/AITC A190. 1-1992) *American Institute of Timber Construction* (AITC) ( 1992 ), were used as the standard for comparisons of performance of these chemical primers and epoxy adhesive formulations.

EXPERIMENT 1

This experiment was designed to determine if surface-primers of either a 5% aqueous HMR coupling agent, a 2% aqueous polyethylenimine (PEI) solution, or a combination of the two, could improve the durability of adhesion of a typical bisphenol-A epoxy adhesive in Sitka spruce lumber laminates. The effectiveness of adhesion was evaluated by measuring resistance to delamination after laminated lumber joints were subjected to the severe cyclic delamination test of ASTM Specification D 2559. This test is specified for qualifying adhesives for structural exterior laminated timbers according to ANSI/AITC A190.1-1992. *American Institute of Timber Construction* (AITC) (1992).

The required tests of shear strength and percent wood failure of dry bonds, as well as creep resistance, were not conducted because these epoxy adhesives readily meet these requirements. However, as a matter of cursory interest, strength tests were conducted on delamination specimens bonded with the best-performing adhesive-primer system-after the specimens had been subjected to the cyclic delamination test.

Experimental Materials

PEI is a highly branched polyamine that has been used as a primer to enhance adhesion of polyolefins to cellulosic fiber, and it has reportedly enhanced the durability of epoxy bonds to wood during outdoor exposure Caster (1980). PEI can function as a cationic polyelectrolyte, and it is attracted to anionically charged cellulosic surfaces. It can also react with epichlorohydrin which is a component of epoxy adhesives. PEI is a high molecular-weight homopolymer in a 50% aqueous solution.

A 2% aqueous solution was selected as an appropriate concentration after preliminary experiments indicated that higher concentrations interfered with adhesion. It is critical that very dilute solutions be used to obtain appropriate polymer distribution. As with the aqueous HMR coupling agent, all water from the PEI primer must be evaporated before bonding with epoxy adhesives.

Epoxy Adhesives

The epoxy adhesive formulations were based on diglycidylether of bisphenol-A resin and triethylenetetramine curing agent, identified by their manufacturer DOW Chemical Company as D.E.R. 331 and D.E.H. 24, respectively. They were mixed 88.5 parts (weight basis) of resin to 11.5 parts of curing agent. For diluted mixtures, 10% nonreactive benzyl alcohol was added. For thickening mixtures, 4% hydrophobic fumed silica, N70-TS grade Cab-O-Sil by Cabot Corporation, was added.

Sitka Spruce

Sitka spruce was selected for the study because of its generally straight and uniform grain, gradual transition from spring- to summer-wood, and moderately low density near 0.42 (oven-dry weight and volume at 12% moisture content). Such a low-density wood could be penetrated more easily by high molecular-weight epoxy adhesive. Sitka spruce has been the preferred wood for aircraft construction because of its high strength-to-weight ratio. The lumber was flat-sawn from flitches, then conditioned to 12% equilibrium moisture content (EMC). Within 24 hours of either priming or bonding, the lumber was knife-planed to ¾-inch (19 mm) thickness. Experimental Design The experimental design with experimental factors and respective levels of treatment are shown in Table 1.

TABLE 1

| Experimental Factors | | Levels of Treatment |
|---|---|---|
| Epoxy Adhesives | (K) | D.E.R. 331 + D.E.N. 24 |
| | (KC) | D.E.R. 331 + D.E.N. 24 + Cab-O-Sil (4%) |
| | (B) | D.E.R. 331 + D.E.N. 24 + Benzyl alcohol (10%) |
| | (BC) | D.E.R. 331 + D.E.N. 24 + Benzyl alcohol (10%) + Cab-O-Sil (4%) |
| Primers | (R) | Hydroxymethyl resorcinol (5.0%) |
| | (P) | Polyethylenimine (2.0%) |
| | (RP) | Hydroxymethyl resorcinol (5.0%)/Polyethylenimine (2.0%) |
| | (N) | None |

This experiment was a completely randomized model with factorial arrangement of 4 epoxy adhesives and 4 surface primers to yield 16 treatment combinations. Each treatment combination was replicated 3 times. A replicate was a 6-ply lumber laminate, from which 3 sections were cut. Delamination was measured from 5 bondlines on each end of the 3 sections in each of the 3 replicate lumber laminates for a total of 90 bondlines for each treatment combination. Analyses of variance were conducted for percentages of delamination. Because the percentages were not normally distributed, it was necessary to use the arcsine square root transformation to fulfill the requirements for normality of the experimental model. Snedocor and Cochran (1967). The Ryan-Einot-Gabriel-Welsch multiple comparison F test was used to detect significant differences between treatment combinations. Welsch (1977).

Preparation of Test Joint Assemblies

A test joint assembly was prepared by laminating 6 pieces of lumber, each measuring ¾ inch (19 mm) thick, 3 inch (76 mm) wide, and 12 inch (305 mm) long, with a test adhesive so that 5 separate bondlines were available for measuring delamination. If lumber surfaces were to be primed with either HMR coupling agent or PEI solution, aqueous solutions were spread on each bonding surface with a brush at a rate near 30 lbs/Mft$^2$ (0.15 kg/m$^2$). The lumber was spread with adhesive on each bonding surface to total 70 lbs/Mft$^2$ (0.35 kg/m$^2$) in each bond line.

The adhesive was spread with a roller, and the accuracy of the spread was controlled by automatically weighing as adhesive was spread on each bonding surface. Closed assembly time ranged from 70 minutes after the first bondline was spread with adhesive to 60 minutes after the last bondline was spread. Open time was no more than 2 minutes for any bondline. The initial pressure for curing was about 20 lbs/in$^2$ (138 kPA), although pressure application was stopped once squeeze-out began from all bondlines. Test joint assemblies were kept, under pressure about 15 hours at room temperature. After removing laminates from the press, the bondlines were essentially cured to the same degree by heating the laminates at 150° F. (5.5° C.) and 12% EMC for 5 hours in an environmental chamber.

Cyclic Delamination Test

The three, 3-inch-long (76 mm) sections cut from each test joint assembly were used for measuring resistance to delamination. Delamination along all end-grain surfaces was measured to the nearest 0.01 in (0.25 mm) with a machinist's scale under a stereo-microscope. A single delamination value expressed as a percentage of bondline length was computed for each section for a total of 3 delamination percentages for each test joint assembly. Measurements were made after each of the 3 cycles, although the statistical analyses were based on delamination after all 3 cycles were completed.

In its essentials, ASTM Specification D 2559 cyclic delamination test consists of 3 cycles of the following events:

1st Cycle:
(1) Vacuum-soak in water at 25 in (635 mm) Hg for 5 minutes;
(2) Pressure soak in water at 75 lbs/in$^2$ (517 kPa) for 1 hour;
(3) Repeat events (1) and (2);
(4) Dry at 150° F. (65.5° C.) for 20 hours.

2nd Cycle:
(1) Steam at 212° F. (100° C.) for 1 hour 30 minutes,
(2) Pressure-soak in water at 75 lbs/in$^2$ (517 kPa) for 40 minutes,
(3) Repeat event (4) in 1st Cycle, 3rd Cycle:
(1) Repeat events in 1st Cycle.

Strength Test After Cyclic Delamination

After the cyclic delamination test, the 3-inch-long sections were cut into stair-step shear specimens, as described in ASTM Specification D 2559. *American Society for Testing and Materials* (ASTM) (1992). Thus, each of the 5 joints in a section could be tested for its shear strength and estimate of percent of wood failure, as it was compression-loaded in shear to failure. The step-shear specimens were conditioned to 12% EMC before testing. Only laminates made with epoxy B on the HMR-primed and unprimed surfaces were tested for strength after cyclic delamination.

Delamination. Resistance of Bonds to HMR-Primed Surfaces

The maximum allowable delamination for softwood species is 5.0% when lumber laminates are subjected to the cyclic delamination test of ASTM Specification D 2559-84. Mean delamination percentages of the 4 epoxy formulations on 4 primed surfaces are shown in Table 2. The data clearly indicates that the HMR coupling agent (R) dramatically enhanced the resistance to delamination of all epoxies when compared with the unprimed (N), PEI-primed (P) and HMR/PEI-primed (RP) surfaces. It is also clear that only the epoxy adhesive diluted with benzyl alcohol (B) and bonded to the HMR-primed surface, met the 5.0% delamination requirement. It delaminated 4.5%.

TABLE 2

Delamination of Epoxy Adhesives on
Primed Surfaces of Sitka Spruce.[a]

| Adhesives | Mean Delamination (%) on Primed Surfaces | | | |
|---|---|---|---|---|
| | R | P | RP | N |
| K | 15.3 | 40.9 | 46.7 | 43.7 |
| KC | 12.3 | 58.8 | 53.2 | 31.3 |
| B | 4.5 | 23.7 | 21.8 | 55.1 |
| BC | 12.1 | 21.5 | 27.9 | 31.2 |

[a]Maximum allowable delamination is 5.0% for softwood species when tested according to ASTM Specification D 2559–84.

Delamination was observed and measured with a microscope and a machinist's scale graduated to 0.01 in (0.25 mm). As a result, delamination is perhaps higher than would have been measured with the unaided eye and a machine feeler gauge 0.005 in (0.13 mm) thick and 0.10 in (2.54 mm) wide, as recommended in the ASTM specification.

Tests for significant differences between mean percentages of delamination for all combinations of epoxy adhesives and primers are shown in Tables 3 and 4. In Table 3, comparisons for epoxy B show the mean 4.5% delamination on the R-primed surfaces was significantly lower than delamination on any of the other primed or unprimed surfaces. In comparisons of all adhesives on just the R-primed surfaces in Table 4, the 4.5% delamination of epoxy B was significantly lower than that of any other epoxy formulation, i.e., epoxies BC, KC, and K. The latter 3 epoxies did not differ significantly.

The R-primer produced significantly lower delamination than any other primer regardless of epoxy formulation (Table 3)—with the exception of 1 apparent statistical anomaly. That exception occurred with epoxy K where 15% delamination by the R-primer was not significantly different from 41% by the P-primer.

TABLE 3

Statistical Comparisons of Ranked Means of
Delamination of Primers for Each Epoxy Adhesive

| Adhesives | Mean Delamination (%) on Primed Surfaces[a][b] | | | |
|---|---|---|---|---|
| K | R | P | N | RP |
| | 15 | 41 | 44 | 47 |
| KC | R | N | RP | P |
| | 12 | 31 | 53 | 59 |
| B | R | RP | P | N |
| | 4.5 | 22 | 24 | 55 |
| BC | R | P | RP | N |
| | 12 | 22 | 28 | 31 |

[a]Mean percentages of delamination for primers are ranked left to right with the lowest value first.
[b]Ranked means are statistically compared; means underlined by the same line are not significantly different at the 0.05 level of probability.

Very large variances in delamination were associated with the N-primer (unprimed surfaces) and RP-primer, but the small variance associated with the R-primer overlapped statistically and was shown to be not significantly different. However, the actual differences between the mean of each primer were large.

Strength of Bonds to HMR-Primed Surfaces After Cyclic Delamination

TABLE 4

Statistical Comparisons of Ranked Means of
Delamination of Epoxy Adhesives for Each Primer

| Primers | Mean Delamination (%) of Adhesives[a][b] | | | |
|---|---|---|---|---|
| R | B | BC | KC | K |
| | 4.5 | 12 | 12 | 15 |
| P | BC | B | K | KC |
| | 22 | 24 | 41 | 59 |
| RP | B | BC | K | KC |
| | 22 | 28 | 47 | 53 |
| N | KC | BC | K | B |
| | 31 | 31 | 44 | 55 |

[a]Mean percentages of delamination for adhesives are ranked left to right with the lowest value first.
[b]Ranked means are statistically compared; means underlined by the same line are not significantly different at the 0.05 level of probability.

The cyclic delamination test in ASTM Specification D 2559 is an excellent procedure for challenging ultimate durabilities of structural bonding systems, as well as differentiating between systems. Bonds are subjected to repeated extremes of stress from dimensional change concurrent with rapid and extreme changes in moisture content and heat. However, the required tests of shear strength and wood failure do not challenge durabilities, but merely measure strength of bonds at the time of test—whatever the prior events might have been. In Table 5, the cyclic delamination test clearly differentiated the 4.5% delamination on the HMR-primed (R) surface from the 55% on the unprimed (N) surface. Yet this distinction is not so clearly shown in tests of strength. Epoxy B (diluted with benzyl alcohol) developed 1438 lbs/in$^2$ (992 N/cm$^2$) shear strength and 90% wood failure on the HMR-primed lumber even though bonds had been subjected to the cyclic delamination test. Without the HMR primer, specimens that delaminated 55% still retained a strength of 1251 lbs/in$^2$ (863 N/cm$^2$) and 67% wood failure after cyclic delamination tests. The 50% loss in delamination resistance is disproportionate to the respective 13% and 26% losses in shear strength and wood failure. The minimum dry shear strength required in ASTM Specification D 2559 for Sitka spruce is 1150 lbs/in$^2$ (793 N/cm$^2$) with 75% wood failure. Shear strength on both HMR-primed and unprimed surfaces exceeded the requirement, even though strength was measured after the cyclic delamination test. Wood failure of 90% on the HMR-primed surfaces also exceeded the 75% requirement, but wood failure was only 67% on the unprimed surface. It is generally recognized that the cyclic delamination test requirements are the most difficult to meet, and are a more creditable measure of exterior-bond durability than strength tests.

TABLE 5

Strength & Delamination of Epoxy B Bonds on
HMR-Primed & Unprimed Sitka Spruce After
the Cyclic Delamination Test

| Surfaces<br>Treatments | Shear<br>Strength<br>(lbs/in$^2$) | Wood Failure<br>(%) | Delamination<br>(%) |
| --- | --- | --- | --- |
| HMR-Primed | 1438 | 90 | 4.5 |
| Unprimed (N) | 1251 | 67 | 55.1 |
| Required by<br>ASTM D 2559[a] | 1150 | 75 | 5.0 |

[a]Shear strength and wood failure requirements of ASTM Specification D 2449 based on tests conducted on dry specimens without prior cyclic delamination tests.

Delamination Resistance of Bonds to PEI-Primed Surfaces

The PEI primer (P) enhanced adhesion of 2 of the epoxy adhesives (B and BC) over that achievable on the unprimed lumber, as shown in Table 3. Epoxy B delaminated 24% on the P-primed surfaces, which was significantly lower than 55% delamination on the unprimed (N) surfaces. Likewise, epoxy BC which contained Cab-O-Sil, delaminated 22% on the P-primed surface. This mean was also significantly lower than 31% delamination of epoxy BC on the unprimed (N) surface. The combined surface treatments of HMR primer first, followed by P-primer, produced bonds by epoxies B and BC that were not significantly different from those of the P-primer alone. Bonds by epoxies K (unmodified) and KC (unmodified with Cab-O-Sil), which were of considerably higher viscosity than epoxies B and BC (diluted with benzyl alcohol), developed bonds of much lower delamination resistance (Tables 2 and 3). Table 4 shows that epoxies B and BC were not significantly more durable than either epoxies K or KC on the same surfaces. Variations in delamination percentages were so great on the combined RP-primed surfaces, none of the epoxies had statistically distinguishable differences in resistance to delamination. It seems generally evident that applying the HMR primer before the PEI primer caused no improvement in adhesion over that achievable with the PEI primer alone. Perhaps the cationically-charged PEI adsorbed onto the anionically-charged hydroxyl groups of the HMR primer, thereby blocking any potential for coupling with epoxy adhesives.

Figure 2:
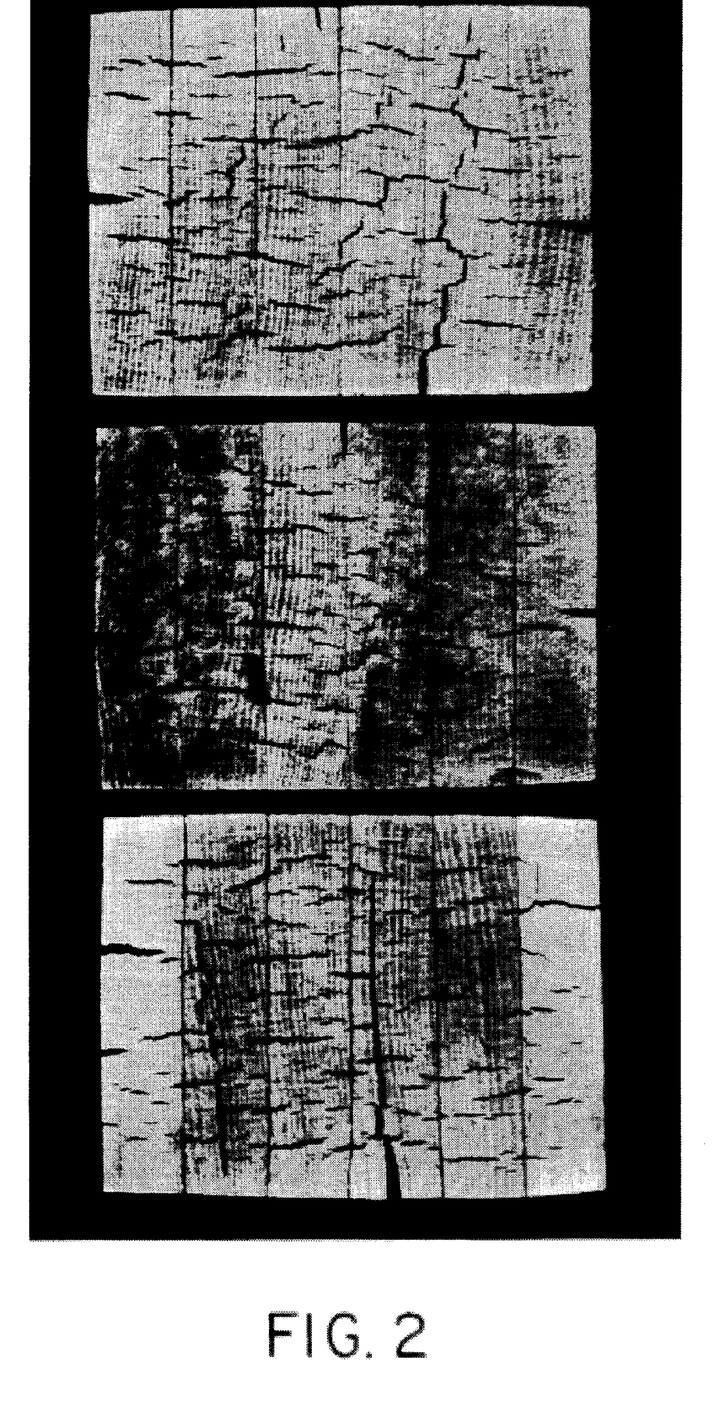
FIG. 2 is a photograph of 3 specimens illustrating absence of delamination after severe aging tests when lumber surfaces are primed with HMR coupling agent.
Figure 3:
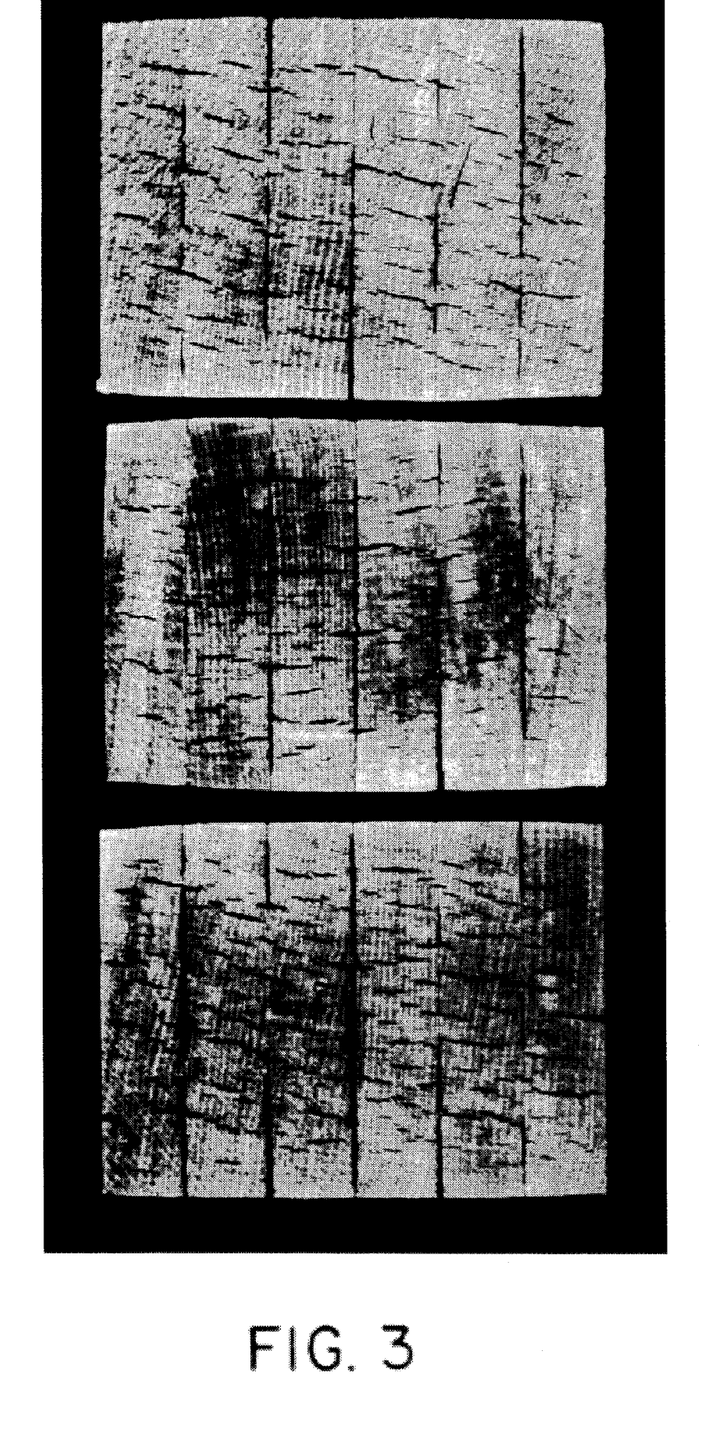
FIG. 3 is a photograph of 3 specimens illustrating severe delamination on unprimed lumber surfaces after severe aging.
Figure 4:
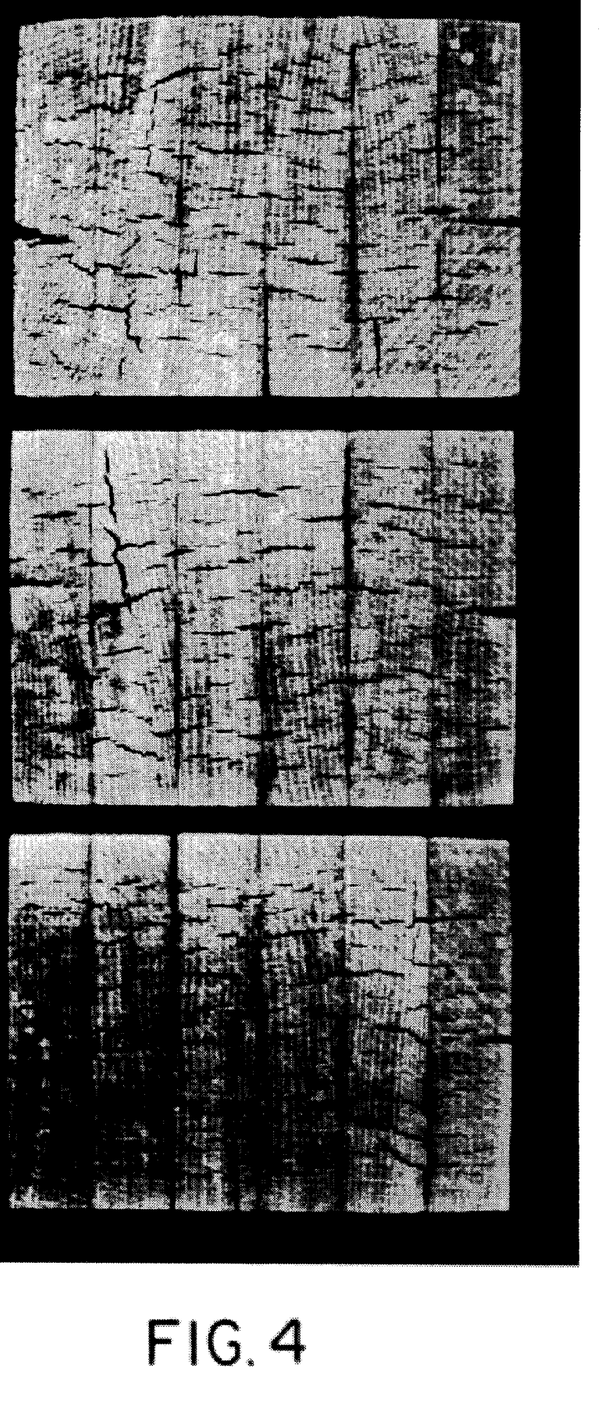
FIG. 4 is a photograph of 3 specimens illustrating severe delamination on surfaces primed with polyethylenimine.

Modes of Delamination and Stress Fracture in Laminates with Primed and Unprimed Surfaces Delaminations of epoxy B-bonds in lumber laminates with surfaces primed with HMR and PEI can be compared with the unprimed surfaces by observing cross-sections in FIGS. 2,3 and 4. Delamination averaged 55% on unprimed surfaces, and 3 typical specimens are shown in FIG. 3. When surfaces were primed with PEI, delamination was reduced to 24%. These examples are shown in FIG. 4. The effectiveness of the HMR primer is quite evident in the examples shown in FIG. 2, where average delamination was reduced to 4.5%. Note in FIG. 2 that stress fractures within the wood itself became greater in size and number as the epoxy bonds became more resistant to delamination. Two stress fractures extend almost completely across 2 laminates without entering a bondline. In bonds of lesser durability, potential wood fractures are relieved by delamination of weaker bonds on unprimed (FIG. 3) and PEI-primed surfaces (FIG. 4).

Figure 5:
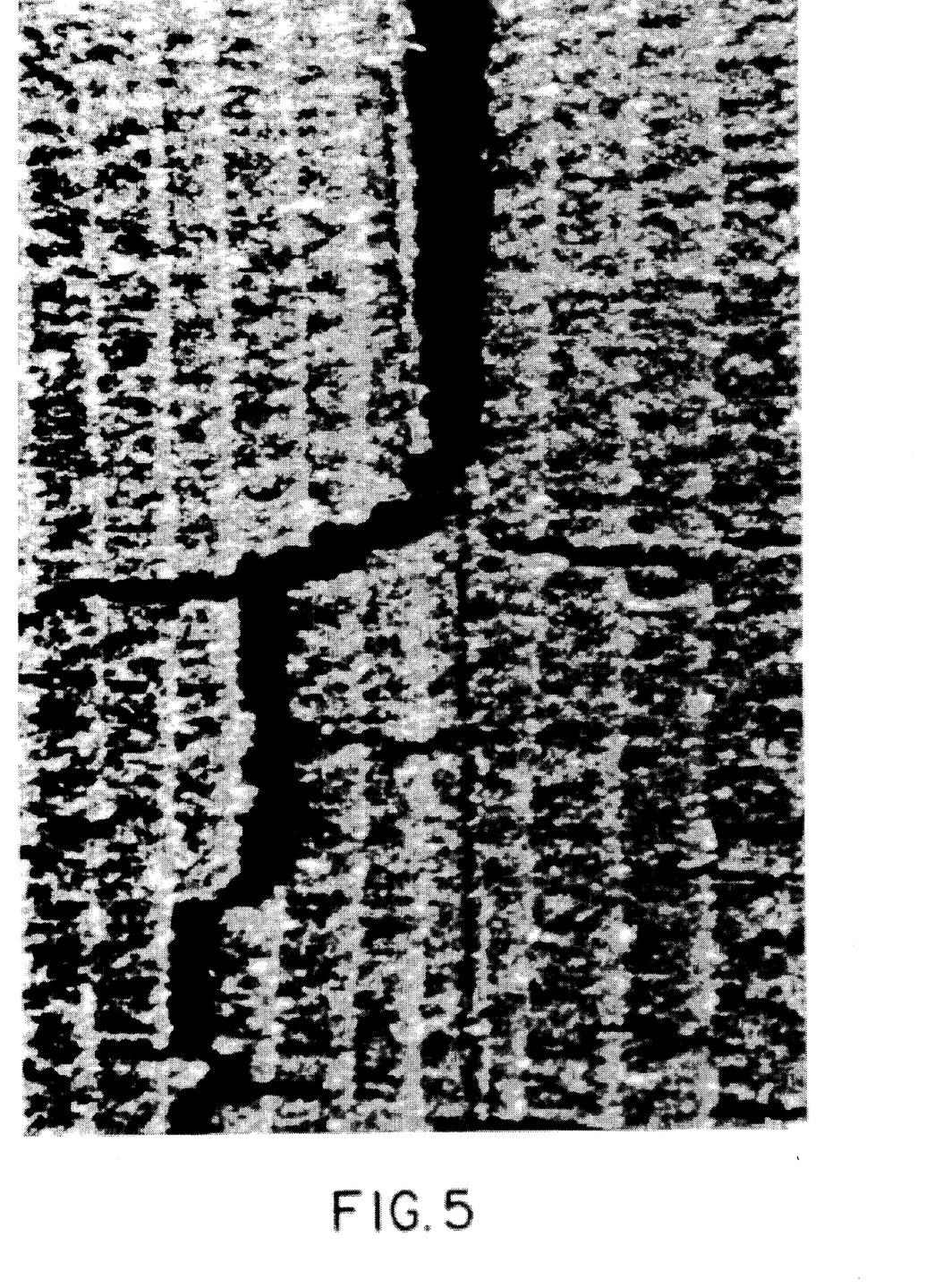
FIG. 5 illustrates absence of delamination—stress fractures occur only adjacent to bondlines and within the laminates themselves, but not in the bondlines when the surfaces are primed with HMR coupling agent.
Figure 6:
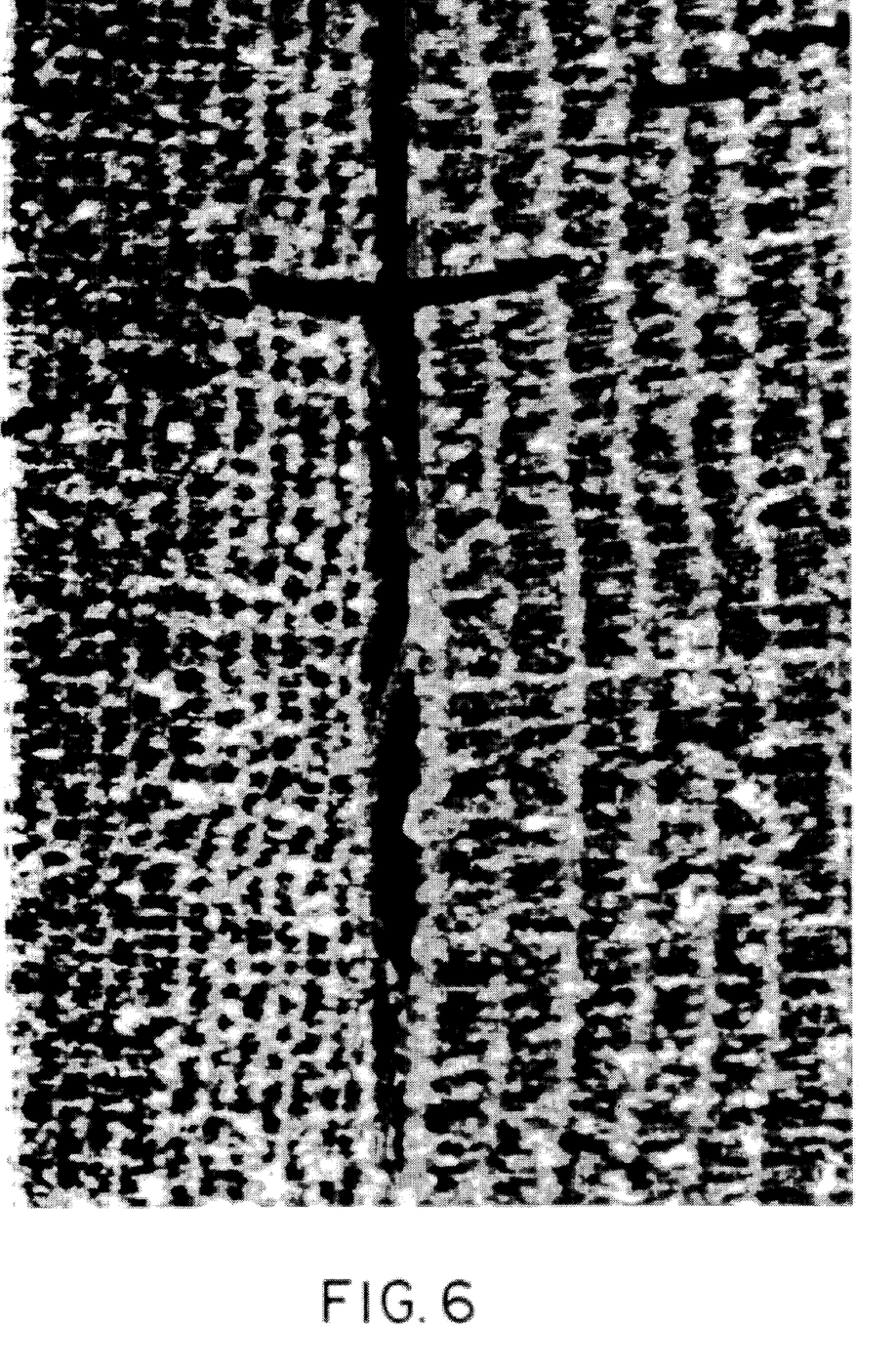
FIG. 6 illustrates complete delamination within bondline when lumber surfaces are unprimed.
Figure 7:
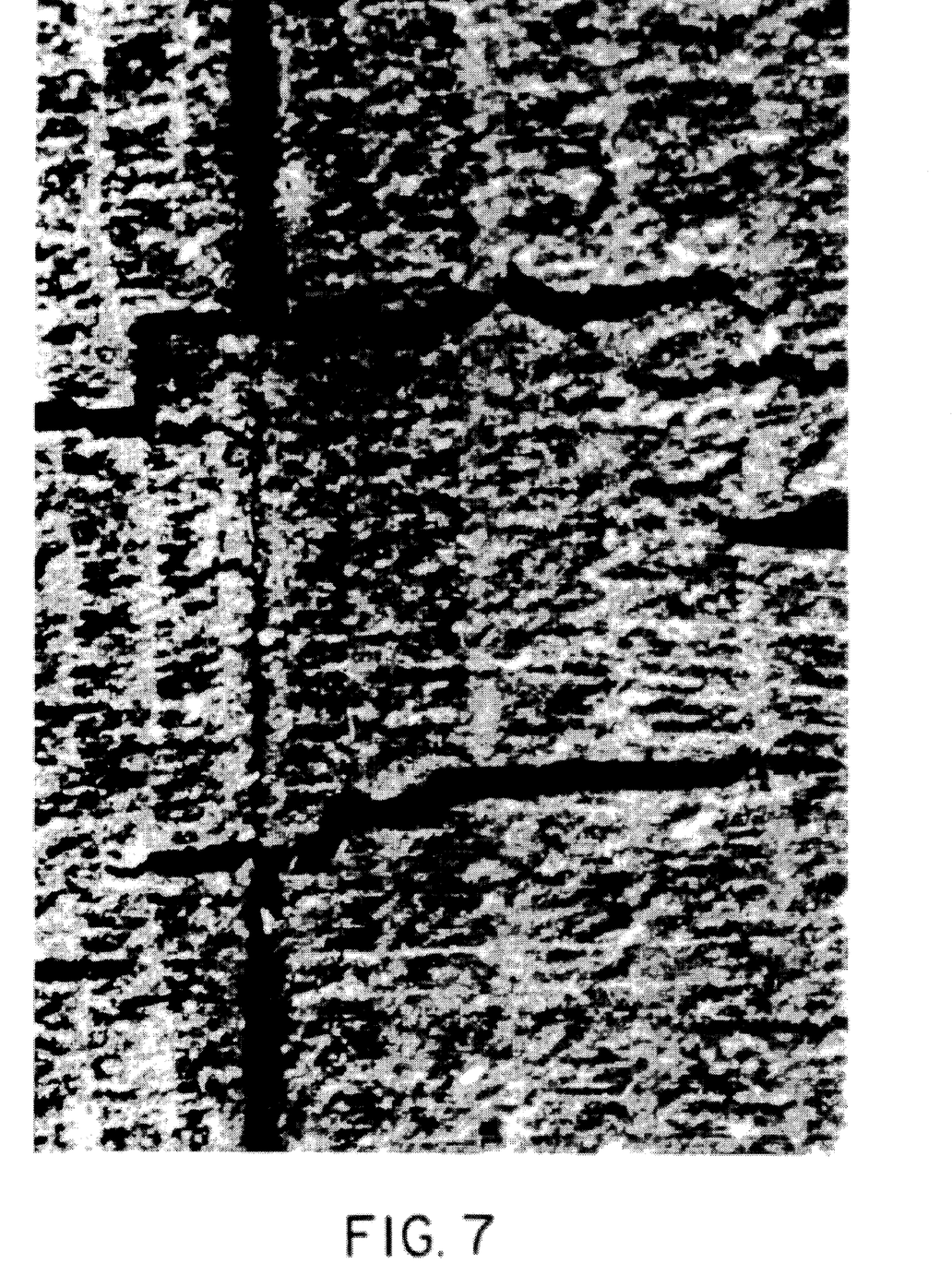
FIG. 7 illustrates partial delamination within bondline when lumber surfaces are primed with polyethylenimine.

As lumber laminates are subjected to severe stresses of drying cycles in the delamination test, many stress fractures initiate and propagate within and adjacent to bondlines at the laminate sides. Typical examples of such stress fractures are shown in FIGS. 5, 6 and 7. When surfaces were not primed, specimens delaminated for indefinite lengths along the bondline with little stress fracturing in the wood, as shown in FIG. 6. With the PEI primer, delamination was more limited in length as stronger and more durable bonds to the primed surfaces caused stresses along the bondlike to eventually fracture the wood, as shown in FIG. 7. With the HMR primer, however, delamination never developed within nor at the interface of the bondline. When fracture occurred near the bondline, wood fibers were always bonded to the epoxy. If only a few cells deep, fracture was considered delamination. If fracture extended to many cells deep as shown in FIG. 5, then no delamination was measured.

Mechanism of Adhesion Enhancement-HMR Coupling Agent

When used as a primer on wood surfaces before adhesive application, the HMR coupling agent enables bisphenol-A epoxy resin with triethylenetetramine curing agent to develop structural, weatherproof bonds to wood that are much more durable than without the coupling agent. Enhanced adhesion occurs primarily by physicochemical adsorption interactions, although mechanical interlocking of the thermoset adhesive within the porous structure of wood is essential for the most durable of bonds. Nonreactive diluents enhance flow and penetrating capability of the epoxy adhesive.

The coupling agent consists of mono-, di-, and tri-hydroxymethyl resorcinol, and perhaps dimers, trimers, and a few oligomers which condense as the induction period increases. The HMR coupling agent is prepared in situ as a dilute aqueous solution and, after an appropriate induction period, it is applied to the wood surfaces before bonding. The HMR coupling agent is reactive at room temperature. Its polymerization must be limited because fewer HMR coupling sites means inhibited adhesion. The resorcinol molecule has 2 hydroxyl groups located meta to each other on the benzene ring which are not reactive themselves; however, methylation takes place at the remaining 2 ortho and 1 para positions. Further condensation reactions can occur with these hydroxymethylated groups as reactive hydroxyl groups from molecules of other chemicals are presented. Three, and perhaps all 5, of the hydroxyl groups can form hydrogen bonds. Hydrogen bonding, if numerous enough, is believed to contribute strongly to adhesive bond durability and strength, even though hydrogen bonds themselves are relatively weak in comparison with covalent bonds.

The HMR coupling agent is believed to covalently bond with a bisphenol-A epoxy resin and the aliphatic amine curing agent as shown in FIG. 1. Functional hydroxyl groups formed along the epoxy chains at positions (5) in FIG. 1 are capable of condensing with the hydroxymethyl groups of the HMR coupling agent to form ether linkages between the coupling agent and epoxy. Other available hydroxymethyl groups on the coupling agent are capable of forming ether linkages with the primary hydroxyl groups on cellulose of wood, as shown at position 7 in FIG. 1. If such is the case, then a completely cross-linked polymeric network is formed between epoxy resin and cellulosics of wood, made possible through the chemical linkages of the reactive HMR coupling agent.

If conditions and cellulosic structures are not available for covalent bonding, then hydrogen bonding is more likely to take place, as shown at position (6) in FIG. 1. Cellulosics and lignin of wood are relatively rich with secondary hydroxyl groups. With multimolecular layers of HMR coupling agent thoroughly covering and penetrating cell lumens and cell walls, opportunities for high-density hydrogen-bonding between molecules are present. Spectrographic chemical analyses have not been conducted as yet to determine which chemical linkages are formed by the coupling agent with adhesives and wood cellulosics.

When used as a primer on lumber surfaces before adhesive application, a hydroxymethylated resorcinol coupling agent enhanced the durability of adhesion of a bisphenol-A epoxy adhesive to Sitka spruce. Epoxy adhesive diluted with benzyl alcohol, developed structural bonds on the HMR-primed lumber that met the 5% delamination requirement of ASTM Specification D 2559. Enhanced adhesion occurred primarily by physicochemical adsorption interactions, although mechanical interlocking of the penetrating epoxy adhesive into the porous structure of wood was essential for the most durable of bonds.

Experiment 2

This experiment was designed to determine the delamination resistance of an emulsion-polymer isocynate adhesive on HMR-primed CCA-treated and untreated Southern pine lumber.

Adhesive

The isocyanate-based adhesive utilized in this experiment was a combination of Isoset WD3-A320 and Isoset CX-47 in a 6:1 ratio. Specifically, 150.0 grams of Isoset WD3-A320 were mixed with 25.0 grams Isoset CX-47. The ingredients were mixed as directed. The Ashland Chemical Co. produces and markets these ingredients.

Coupling Agent (Primer)

For this study, a 5% aqueous HMR coupling agent was utilized. The coupling agent was aged 4 hours before it was spread onto both bonding surfaces of the lumber. The agent was allowed to dry approximately 24 hours at a temperature of approximately 80° F. and 50% relative humidity before the adhesive was applied.

Southern Pine

CCA-treated and untreated Southern pine were selected for this study. The lumber was flat-sawn. All of the treated lumber had the same 0.6 PCF retention. The lumber was conditioned at a temperature of about 80° F. and 50% relative humidity. The boards were surface-planed approximately 24 hours before bonding.

Assembly Conditions

Reference is made to Experiment 1 for a detailed explanation of the assembly procedures. The coupling agent was spread on all bonding surfaces then allowed to dry for approximately 24 hours at 80° F. and 50% relative humidity. The adhesive was then spread on each bonding surface at a rate of 35 lbs/Mft$^2$ (70 lbs./Mft$^2$ on both surfaces). The boards were bonded approximately 30 minutes after all surfaces were spread with adhesive. The initial pressure for curing was approximately 100 lbs./in$^2$.

A test joint assembly was prepared by laminating six pieces of lumber, each measuring ¾ in (19 mm) thick, 3 in (76 mm) wide, and 12 in (305 mm) long.

After laminating, each laminate was cut into three, 3-in-long (76 mm) sections. Resistance to delamination was tested according to the procedures described in Experiment 1.

Results

The treatment factors, levels of treatment, and results, i.e., percent delamination, are shown in Table 6 as follows:

TABLE 6

Delamination of Isoset on HMR-Primed and Unprimed CCA-Treated and Untreated Southern Pine

| TREATMENT | Mean Delamination (%) in Laminates | | | | |
| --- | --- | --- | --- | --- | --- |
| | I | II | III | Avg. | Length[1] |
| UN[2] unprimed | 23.37 | 28.01 | 31.01 | 27.46 | 259.20 |
| UH[3] primed | 0.64 | 1.33 | 0.43 | 0.80 | 258.60 |
| CN[4] unprimed | 31.93 | 30.43 | 20.38 | 27.58 | 236.70 |
| CH[5] primed | 0.63 | 0.58 | 0.96 | 0.72 | 236.10 |

[1]Total Bond-Line Length (inches)
[2]Untreated Southern Pine/No Primer
[3]Untreated Southern Pine/HMR-Primed
[4]CCA-Treated Southern Pine/No Primer
[5]CCA-Treated Southern Pine/HMR-Primed As illustrated in Table 6, delamination was negligible for both untreated (0.80%) and CCA-treated southern pine (0.72%) when HMR primer was used. Delamination was severe when untreated (27.46%) and CCA-treated (27.58%) wood was not primed. The maximum allowable delamination for softwood species is 5.0% when lumber laminates are subjected to the cyclic delamination test of ASTM Specification D2559-84 (ASTM 1992). The Isoset bonds met this requirement when the untreated and CCA-treated lumber surfaces were primed with the HMR coupling agent.

Experiment 3

This experiment was designed to determine if a surface primer of 5.0% aqueous HMR coupling agent could improve the durability of adhesion of typical phenol-resorcinol formaldehyde (PRF) adhesives in lumber laminates of CCA-treated Southern pine. The effectiveness of adhesion was evaluated by measuring resistance to delamination after lumber joints were subjected to cyclic delamination test of ASTM Specification D2559-84 (ASTM 1992). This test is specified for qualifying adhesives for structural exterior laminated timbers according to ANSI/AITC A 190.1-1992 (AITC 1992). The maximum allowable delamination is 5.0% on softwood species.

Adhesive

Two commercially available PRF adhesives that qualify for use in laminating structural exterior timbers under ANSI/AITC A190.1-1992 (AITC 1992) were used in this experiment. Both adhesives cure at room temperature, have pot lives of 2–3 hours and pressure times from 6 to 9 hours. The adhesives, listed below, were mixed according to the manufacturer's instructions.

| Resin | Hardener | Manufacturer |
| --- | --- | --- |
| Penacolite G-4422A | Penacolite G-4400-B | Indspec, Inc |
| Cascophen LT-5210 | Cascoset FM-6210(s) | Borden, Inc. |

Coupling Agent

The HMR coupling agent was prepared in a 3:1 mole ratio of formaldehyde-to-resorcinol at mildly alkaline conditions to yield a 5.0% solids aqueous solution. The chemicals were mixed in the same proportions as described in Experiments 1 and 2, then reacted in situ for 4 hours at 70° F. before application to the lumber surfaces. The primer was allowed to dry 1 hour for one set of laminates, and 24 hours for other sets, at 80° F. and 50% relative humidity, before the adhesive was applied to the primed lumber surfaces.

Treated and Untreated Lumber

Southern pine lumber, 1×6 in, flat-sawn and with minimum specific gravity of 0.51, was selected for study. Other than boards used for the untreated controls, randomly-selected boards were pressure-treated with commercial CCA preservative of Type C to target retentions of 0.4 and 0.6 lbs/ft$^3$. All untreated and treated lumber was kiln-dried and finally conditioned to equilibrium moisture content at 80° F. and 50% RH. The lumber was surface-planed within 24 hours of adhesive bonding.

Assembly Conditions for Test Joint Laminates

Refer to Experiment 1 for a detailed explanation of the assembly conditions.

A test joint laminate was prepared by laminating 6 pieces of lumber, each measuring ¾ in (19 mm) thick, 3 in (76 mm) wide and 12 in (305 mm) long with adhesive so that 5 separate bondlines were available for measuring delamination. Four laminates were prepared for each of the 18 treatment combinations shown in Table 7.

If lumber surfaces were primed with HMR coupling agent, a 5.0% solution was spread on each bonding surface with a brush at a rate near 30 lbs/Mft$^2$ (0.15 kg/m$^2$). The adhesive was spread on each bonding surface with a roller at a rate near 40 lbs/Mft$^2$ (0.20 kg/m$^2$). Closed assembly time was approximately 40 minutes. The initial pressure for curing was approximately 100 lbs/in$^2$ (690 kPa). Laminates were kept under pressure for 15 hours at 70° F. All bondlines were cured an additional 7 days at 80° F. and 50% RH before testing.

Testing Procedures

These procedures are explained in detail in Experiment 1.

Results

The 18 treatment combinations, i.e. treatment factors and levels of treatment, are shown in Table 7 along with percentages of delamination at each treatment combination. Note that the maximum allowable delamination is 5.0% in order to meet the requirements of ANSI/AITC A190.1-1992 (AITC 1992).

As shown in Table 7, both PRF adhesives delaminated 5.0% and less on CCA-treated Southern pine (both 0.4 and 0.6 lbs/ft$^3$ retentions) when the surfaces were primed with the HMR coupling agent. It did not matter whether the primed surfaces were dried 1 hour or 24 hours before applying the adhesives. Performance of both PRF adhesives was unacceptable when the CCA-treated surfaces were not primed with coupling agent. One PRF adhesive delaminated somewhat less than the other on the unprimed CCA-treated Southern pine. Both adhesives met the 5.0% allowable delamination requirement on both unprimed and HMR-primed untreated Southern pine. HMR-priming is essential if PRF bonds on CCA-treated Southern are to meet the delamination requirements of ANSI/AITC A190.1-1992 (AITC 1992).

TABLE 7

Delamination of Phenol-Resorcinol Adhesives on HMR-Primed and Unprimed CCA-Treated and Untreated Southern Pine

| Adhesives | CCA Retentions (lbs/ft3) | Mean Delamination | | |
| --- | --- | --- | --- | --- |
| | | Unprimed (%) | Primed dried 1 hr (%) | Primed dried 24 hrs (%) |
| Penacolite | 0.0 | 3.4 | 1.4 | 2.3 |
| G-4422 | 0.4 | 17.3 | 4.8 | 5.0 |

TABLE 7-continued

Delamination of Phenol-Resorcinol Adhesives on HMR-Primed and Unprimed CCA-Treated and Untreated Southern Pine

| Adhesives | CCA Retentions (lbs/ft3) | Mean Delamination | | |
| --- | --- | --- | --- | --- |
| | | Unprimed (%) | Primed dried 1 hr (%) | Primed dried 24 hrs (%) |
| | 0.6 | 17.6 | 4.4 | 4.1 |
| Cascophen | 0.0 | 2.1 | 1.7 | 2.2 |
| LT-5210 | 0.4 | 10.5 | 3.9 | 3.7 |
| | 0.6 | 12.4 | 5.1 | 2.6 |

It is understood that the invention is not confined to the particular construction and arrangements herein illustrated and described, but embraces such modified forms thereof and comes within the scope of the claims.

BIBLIOGRAPHY

"American Institute of Timber Construction" (1992) *American National Standard for wood Products-Structural Glued Laminated Timber.* ANSI/AITC A190.1-1992, AITC, Vancouver, Wash. 16 pp.

"American Society for Testing and Materials" (1992) Standard specification for adhesives for structural laminated wood products for use under exterior (wet use) exposure conditions, ASTM Designation: D 2559-84 [Reapproved 1990]. *Annual Book of ASTM Standards.*, 15.06, ASTM, Philadelphia, Pa. 167–171.

Caster, D. (1980) "Correlation between Exterior Exposure and Automatic Boil Test Results." Proceedings of the 1980 Symposium Wood Adhesives—Research, Application, and Needs. USDA Forest Service, Forest Products Laboratory, Madison, Wis. 179–188.

Clark, J. T. and W. T. Nearn (1957) "Factors Affecting the Quality of an Epoxy Resin Wood-to-Wood Bond." *Forest Products Journal* 7(1):20–27.

Olson, W. Z. and R. F. Blomquist (1962) "Epoxy-Resin Adhesives for Gluing Wood" Forest Products Journal 12(2): 7 4–80.

Snedocor, G. W. and W. G. Cochran (1967) *Statistical Methods* (6th Ed.) Iowa State University Press, Ames, Iowa, pp. 327–328.

Solomon, T. S. (1990) "Bonding Textiles to Rubber." Chapter in: *Handbook of Adhesives,* Second Edition, Skeist, I. (ed.) Van Nostrand Reinhold, N.Y., pp. 661–668.

Vick, C. B. and T. A. Kuster (1992) "Mechanical Interlocking of Adhesive Bonds to CCA-Treated Southern Pine—A Scanning Electron Microscopic Study." *Wood and Fiber Science* 24 (1): 36–46.

Welsch, R. E. (1977) "Stepwise Multiple Comparison Procedures." *J. Amer. Stat. Assoc.,* 72 (359): 566–575.

Williamson-, F. L. and W. T. Nearn (1958) "Wood-to-Wood Bonds With Epoxide Resins-Species Effect." *Forest Products Journal* 8 (96): 182–188.

What is claimed is:

1. A method of enhancing the adhesion of an adhesive to a lignocellulosic material, comprising the steps of:

(a) preparing an aqueous alkaline solution of resorcinol and at least one compound selected from the group of formaldehyde and paraformaldehyde;

(b) allowing the solution to react in situ for a period of time sufficient to allow hydroxymethylated resorcinol derivative dimers, trimers and oligomers thereof to form, wherein the period of time is between 4–6 hours;

(c) priming the surface of a lignocellulosic material with the reacting mixture of step (b);

(d) allowing the primed surface to dry; and (e) applying an adhesive to the primed surface.

2. The method of claim 1 wherein the solution of step (a) comprises approximately 90.43 parts by weight water, approximately 3.79 parts by weight 37% formaldehyde, approximately 2.44 parts by weight 3M sodium hydroxide and approximately 3.34 parts by weight crystalline resorcinol in sufficient amounts to coat the surface of the lignocellulosic material of step (c).

3. The method of claim 1 wherein the lignocellulosic material is wood.

4. The method of claim 3 wherein the wood is chromated-copper-arsenate treated wood.

5. The method of claim 1 wherein the adhesive is selected from the group consisting of epoxy resins, phenol-formaldehyde resins, phenol-resorcinol-formaldehyde resins, resorcinol-formaldehyde resins, isocyanate resins, emulsion polymer/isocyanate resins, and amino resins.

6. The method of claim 1 wherein the solution is reacted at a temperature between 65° F. and 85° F.

7. The method of claim 1 wherein the solution is a 5% solids aqueous solution.

8. The method of claim 1 wherein the solution of step (a) additionally comprises a surfactant which is added at the conclusion of step (b).

* * * * *